Sept. 14, 1926.

V. A. FYNN 1,599,755

ALTERNATING CURRENT MOTOR

Filed Nov. 26, 1923

Inventor.
VALÈRE ALFRED FYNN.
By John H. Bruninga
His Attorney.

Patented Sept. 14, 1926.

1,599,755

UNITED STATES PATENT OFFICE.

VALÈRE ALFRED FYNN, OF ST. LOUIS, MISSOURI.

ALTERNATING-CURRENT MOTOR.

Application filed November 26, 1923. Serial No. 677,158.

My invention relates to dynamo electric machines in which a revolving field of more or less uniform magnitude is produced at least during the starting period. More particularly it relates to polyphase synchronous motors.

The objects and features of this invention will appear from the detail description taken in connection with the accompanying drawing and will be pointed out in the claims.

Figure 1:
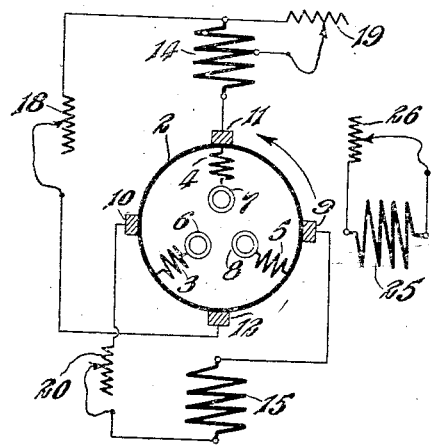
Figure 2:
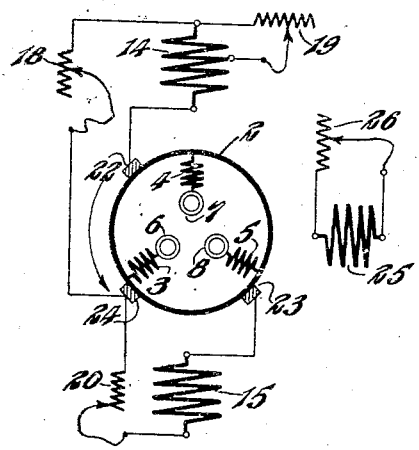

The accompanying diagrammatic drawings, Figures 1 and 2, illustrate two embodiments of my invention as applied to two-pole motors.

Referring to Figure 1, which represents a machine with a revolving primary, the latter carries a commuted winding 2 and a three-phase winding 3, 4, 5, the commuted winding being located in the central or neutral point of the star connected three-phase winding, one end of each phase of which is connected to the commuted winding and the other end to one of the slip-rings 6, 7, 8. The commuted winding 2 may, however, be independent of the polyphase winding. Two sets of brushes 9, 10 and 11, 12 displaced by 90 electrical degrees co-operate with the commuted winding and for simplicity's sake are shown as resting directly on the latter. In practice, a commutator would, of course, be used. The stationary member, which in this case is the secondary, carries a winding 15 in circuit with the brushes 9, 10 and located in an axis displaced by 90 electrical degrees from the axis of said brushes. The resistance of the circuit comprising the winding 15 can be changed by means of the adjustable and preferably non-inductive resistance 20. The winding 14 in circuit with the brushes 11, 12 and located in the axis of said brushes is part of a circuit, the resistance of which can be changed by means of the adjustable and preferably non-inductive resistance 18, a part of the winding 14 being shunted or short-circuited by means of the adjustable and preferably non-inductive resistance 19. The third winding 25 located on the secondary and displaced by 90 electrical degrees from the winding 14 is adapted to be shunted or short-circuited by means of the adjustable and preferably non-inductive resistance 26.

Turning to Figure 2, the construction of the primary or revolving member is identical with that of Figure 1, but the polyphase arrangement of brushes is differently located with respect to the windings on the secondary and also differently connected to the same. The brushes 22, 24 are displaced by 90 electrical degrees from each other and their axis is displaced by the same amount from the axis of 23, 24, which are also displaced 90 electrical degrees from each other. The winding 14 is coaxial with the brushes 22, 24 and connected to the same with the interposition of the adjustable resistance 18. Part of 14 can be shunted or short-circuited by the adjustable resistance 19. The winding 25 is displaced 90 electrical degrees from 14 and adapted to be shunted or short-circuited by the adjustable resistance 26. The winding 15 is coaxial with 14 and displaced 90 electrical degrees from the brushes 24, 23 to which it is connected with the interposition of the adjustable resistance 20.

In order to get the full benefit of the combination of elements shown in Figures 1 and 2, it is necessary to make the stationary as well as the revolving member without defined polar projections just as is usual in the case of polyphase induction motors. Not only do I prefer to use a stator and rotor construction, but also a short air-gap or clearance between the two members. Synchronous motors embodying the said structural features are sometimes referred to as synchronous-induction motors because of their ability to operate synchronously over one range of loads and non-synchronously over another.

Generally speaking, it is my aim to start the machine disclosed herein as a polyphase induction motor, to utilize one or more windings used for the said purpose to produce a strong synchronizing torque, thus bringing the machine into synchronism, and further to utilize at least one of the starting windings to produce a unidirectional magnetization or to utilize one of said windings to produce an initial or no-load unidirectional magnetization and another of said windings to produce an additional or compounding unidirectional magnetization varying with the unidirectional load reaction of the motor or a component of the same.

In operating either embodiment of my invention I produce a primary revolving flux of more or less uniform magnitude by impressing phase displaced voltages on the slip-rings 6, 7, 8. I may disconnect the resistances 19 and 20, thus leaving winding 15 on open circuit, but I prefer to leave the circuit of this winding closed. If left closed, I adjust the resistances 18, 20 and 26 to a value which will give me a sufficient induction motor torque at starting. As the speed increases all of these resistances may be diminished in one or more steps as is usual in induction motor practice. As the synchronous speed is approached, the induction motor torque diminishes rapidly and becomes zero at synchronism, but the winding 14 is in the best possible position with respect to the brushes 11, 12 to produce a synchronizing torque and the latter increases as synchronism is approached. This torque is brought about not by a current induced in 14 by the primary revolving flux, but by a current due to the very low periodicity auxiliary voltage appearing at the brushes 11, 12 and generated in the commuted winding by the primary flux. This auxiliary voltage is practically a maximum in the circuit of 14 when the primary revolving flux is displaced 90 electrical degrees from the brush line 11, 12 or 22, 24 and, therefore, in the best space relation to 14 to produce a torque with ampereturns in 14. Because of the low periodicity of the auxiliary or brush voltage near synchronism, there is practically no phase difference between current and electro-motive force in any of the brush circuits at that time. Very near synchronism the current induced in any of the secondary windings 14, 15, 25 is so small as to be negligible. The winding 15 also produces a synchronizing torque but its maximum is much smaller than the maximum due to 14 and it is sometimes positive and sometimes negative. For this reason the circuit of 15 should be open during the starting operation but the small disturbing effect due to the alternating synchronizing torque thus produced is counterbalanced by advantages which are available when the circuit of 15 is closed.

After the machine has been pulled into synchronism by 14, and this can be done under load conditions, the motor continues to operate like a synchronous machine. The winding 15 provides what may be termed the initial unidirectional magnetization for it is available at no load. The winding 25 is inactive and the winding 14 provides a unidirectional magnetization which varies with the magnitude of that component of the unidirectional primary armature reaction which is displaced 90 electrical degrees from the axis of 14 and 15 or from that of the brushes 11, 12, or 22, 24. As the load varies, so does the axis of this primary reaction vary and in varying it not only affects the ampere-turns in 14 but also in 15. When there is no primary unidirectional armature reaction or when the axis of such reaction coincides with that of the brushes 11, 12 there are no ampereturns in 14.

When the machine gets overloaded as a synchronous motor it falls out of step but continues to operate like an asynchronous motor, winding 25 again becoming active and the winding 14 producing a decreasing synchronizing and an increasing induction motor torque.

In order to relieve the commutator of some of the starting current and make the secondary system of polyphase windings more balanced so far as impedance, and, therefore, torque efficiency, is concerned I can shunt or short-circuit a part of the winding 14 by means of the adjustable resistance 19.

It is assumed that for the counter-clockwise direction of rotation indicated in the figures the unidirectional magnetization produced by the windings 14 and 15 is directed downwards and the primary armature reaction at right angles to the axis of these windings is directed from right to left.

The effect of the winding 14 is to increase or compound the unidirectional magnetization with an increase in load, thus upholding the power factor of the machine and increasing its overload capacity.

The operation of Figure 2 is identical with that of Figure 1 with the exception that none of the secondary circuits in Figure 2 are subjected to the maximum available auxiliary or commuted voltage, the brushes to which the several windings are connected spanning less than 180 electrical degrees. This makes it possible to reduce the auxiliary or brush voltage impressed on any of the secondary windings to a value less than that which can be obtained by reducing the number of commutator segments to the smallest practically possible value and by using no more than one turn per segment. It is important for many reasons to keep the voltage in question as low as possible and this is a simple and effective way of doing so.

It will, therefore, be seen that in accordance with one form of this invention, at starting, the currents of differing phases flowing in the displaced primary circuits of the primary winding produce or set up a primary revolving flux which revolves with respect to the primary; this induces or generates secondary torque producing currents in a circuit or circuits comprising one or more windings on the secondary so as to start the machine as a polyphase induction motor. The secondary winding 14 is preferably always used at starting. The primary revolving flux, moreover, produces or sets upon voltages in the commuted winding on the primary, which voltages are collected by the brushes co-operating with the commuted winding. These auxiliary brush voltages are always of slip frequency and become unidirectional at synchronism. At synchronism they vary with the load on the motor. The auxiliary brush voltage impressed on the circuit comprising the winding 14 causes the flow of a conduced current in 14, setting up ampere-turns and a flux, which, near synchronism and in conjunction with the primary revolving flux produces a synchronizing torque; while at synchronism the flux due to the conduced current in 14 forms part of the exciting field and may be spoken of as a compounding flux. The winding 14, therefore, not only forms the compounding winding; but near synchronism this winding serves to set up increasing ampere-turns or an increasing torque producing flux which cooperate with the primary revolving flux to produce the synchronizing torque; and at starting this winding forms with one or more other stator windings the secondary of an induction motor and co-operates in producing the induction motor torque used at starting.

To secure the desired powerful pull-in or synchronizing torque it is necessary to so dimension the winding 14 that the ampere-turns it produces near synchronism, due to the auxiliary brush voltage 22, 24 or 11, 12 impressed on it, are sufficiently large to produce the desired torque in conjunction with the primary revolving flux then available. This settles the resistance and the number of turns of winding 14 for this purpose and it is best to give this winding many turns as compared with the effective commuted winding turns. But this winding 14 must also be suitable for compounding the machine and must be capable of producing the ampere-turns necessary for this other duty when the brush voltage is unidirectional. One of the objects of the adjustable resistance 18 is to make it possible to make such changes in the resistance of the circuit comprising the winding 14 as well enable it to produce the desired synchronizing torque near synchronism and the desired compounding at synchronism.

When the primary is stationary the revolving flux revolves synchronously with respect to it and the secondary revolves in the same direction as this revolving flux. In asynchronous operation, the speed of the secondary is a little short of that of the revolving flux; at synchronism the speed of the secondary is the same as that of the revolving flux. In applying this invention to a stationary primary, the brushes co-operating with the commuted winding on the primary must revolve with the secondary but the operation of the machine remains as here explained for the converse arrangement. It is to be understood that a synchronous motor in a machine capable of operating at a constant and synchronous speed under varying load conditions and which does so operate. The synchronous motors described in this specification carry unidirectional ampere-turns on their secondary and unless the organization of the machine is such as to permit, with changing torque demand, (1) of an angular displacement between the axis of said ampere-turns and the axis of the resultant motor magnetization, or (2) of a change in the magnitude of said ampere-turns or (3) of said angular displacement and of said change in magnitude, the motor cannot and does not run at a constant and synchronous speed under varying load conditions.

It is further to be understood that by 'synchronous torque' is meant a torque exerted by a synchronous motor when in normal operation and therefore when running synchronously under load. By 'synchronizing torque' is meant any torque adapted to or capable of bringing up to synchronism a motor capable of operating synchronously under varying load conditions. It is, for instance, known that an ordinary polyphase induction motor is a non-synchronous machine the torque of which falls off very rapidly as synchronism is approached and actually becomes zero at synchronism. It is also known that a polyphase induction motor can be so modified as to make it capable of operating synchronously under varying load conditions. Any torque which, in a polyphase induction motor adapted to operate synchronously under varying load, will bridge the gap between the induction motor torque of the machine, which becomes zero at synchronism, and its synchronous torque is referred to as a 'synchronizing torque.'

A synchronous motor is said to be 'compounded' when the unidirectional ampere-turns on the secondary are smaller at light than at heavy loads. This change in the unidirectional ampereturns with changing load affects the power factor at which the machine operates. The change can be such that the power factor remains practically constant throughout the synchronous load range of the motor, or it can be such that the power factor is a leading one at light loads, that this lead diminishes with increasing load and is converted into a lag near the maximum synchronous torque of the machine. Either of these 'compounding characteristics' are popular and right now the last named is probably more in demand.

It will be clear that various changes may be made in the details of this disclosure without departing from the spirit of this invention, and it is, therefore, to be understood that this invention is not to be limited to the specific details here shown and described. In the appended claims I aim to cover all the modifications which are within the scope of my invention.

Having thus described the invention, what is claimed is:

1. A motor which carries variable load at synchronous speed, having a primary and a secondary member without defined polar projections, windings on the primary member adapted to produce a primary flux which revolves with respect to the primary, a winding on the secondary adapted to have generated therein induction-motor-torque producing ampereturns, means for producing an auxiliary voltage of slip frequency which becomes unidirectional at synchronism and increases with increasing load on the motor, and means for impressing said auxiliary voltage on the winding on the secondary and for adjusting the phase thereof adapted to produce a synchronizing torque reaching a maximum when the auxiliary voltage of slip frequency is at or near its maximum, and to produce at synchronism a unidirectional magnetization increasing with increasing load.

2. A motor which carries variable load at synchronous speed, having a primary and a secondary member without defined polar projections, windings on the primary member adapted to produce a primary flux which revolves with respect to the primary, two windings on the secondary at least one of which is adapted to have generated therein induction-motor-torque producing ampereturns at starting, a source of auxiliary voltages, said voltages being of slip frequency, differing in phase at sub-synchronism, becoming unidirectional at synchronism and varying in magnitude with varying motor load, means for impressing one auxiliary voltage on one of the windings on the secondary and for adjusting the phase thereof adapted to produce a synchronizing torque which reaches a maximum when said one auxiliary voltage of slip frequency is at or near a maximum, and means for impressing the other auxiliary voltage on the other secondary winding.

3. A motor which carries variable load at synchronous speed, having a primary and a secondary member without defined polar projections, windings on the primary member adapted to produce a primary flux which revolves with respect to the primary, three windings on the secondary, two of which are coaxial, one of the coaxial windings and the other winding on the secondary being adapted to have generated in them induction-motor-torque producing ampereturns, a source of auxiliary voltages, said voltages being of slip frequency, differing in phase at subsynchronism, becoming unidirectional at synchronism and varying in magnitude with varying motor load, means for impressing one auxiliary voltage on one of the coaxial windings on the secondary and for adjusting the phase thereof adapted to produce a synchronizing torque which reaches a maximum when said one auxiliary voltage of slip frequency is at or near a maximum, and means for impressing the other auxiliary voltage on the other coaxial winding and for adjusting the phase thereof, the two last mentioned means cooperating to produce at synchronism secondary unidirectional magnetizations the resultant of which increases with increasing motor load.

4. A motor which carries variable load at synchronous speed, having a primary and a secondary member without defined polar projections, windings on the primary member adapted to produce a primary flux which revolves with respect to the primary, a commuted winding on the primary, brushes carried by the secondary and adapted to cooperate with the cummuted winding to produce an auxiliary voltage of slip frequency, displaced windings on the secondary, said windings being adapted to have generated in them induction-motor-torque producing ampereturns at starting, said brushes being positioned approximately along the axis of one of the windings on the secondary and connected to it to produce a synchronizing torque which reaches a maximum when the auxiliary slip frequency voltage is at or near a maximum and at synchronism a unidirectional magnetization on the secondary which increases with the load on the motor.

5. A motor which carries variable load at synchronous speed, having a primary and a secondary member without defined polar projections, windings on the primary member adapted to produce a primary flux which revolves with respect to the primary, a commuted winding on the primary, brushes located along displaced axes and carried by the secondary adapted to cooperate with the commuted winding to produce auxiliary voltages of slip frequency and differing in phase at subsynchronism, three windings on the secondary two of which are coaxial, one of the coaxial windings and the other winding on the secondary being adapted to have generated in them induction-motor-torque producing ampereturns at starting, brushes along one axis connected to that coaxial winding on the secondary which is used at starting, said connection being adapted to produce a synchronizing torque which reaches a maximum when the slip frequency brush voltage is at or near a maximum, and brushes along the other axis connected to the other coaxial winding.

6. A motor which carries variable load at synchronous speed, comprising, a primary and a secondary member without defined polar projections, a commuted and a polyphase winding on the primary member, the polyphase winding being adapted for connection to the supply, an exciting and a coaxial compounding winding on the secondary member, brushes located to co-operate with the primary commuted winding along two displaced axis, one of which coincides with that of the compounding winding, the brushes in either axis spanning less than 180 electrical degrees, said compounding winding being connected to the commuted winding by way of two of said brushes along an axis coinciding with its own axis and the exciting winding being connected to the commuted winding by way of some of said brushes and along another axis, and a third winding on the secondary displaced from the compounding winding and adapted to carry secondary induced currents at starting.

7. A motor which carries variable load at synchronous speed, comprising, a primary and a secondary member without defined polar projections, the primary being adapted to produce a primary flux which revolves with respect to the primary and having a commuted winding and brushes co-operating therewith, said brushes tapping the commuted winding along two displaced axes one brush being common to both axes, an exciting, a coaxial compounding and a displaced auxiliary winding on the secondary, the compounding winding being connected to and located in the axis of one set of brushes, and the exciting winding being connected to the other set of brushes.

8. The method of operating a motor which carries variable load at synchronous speed, comprising, producing a primary flux which revolves with respect to the primary, causing the primary flux to generate induction-motor-torque producing ampereturns in a secondary circuit, producing an auxiliary voltage of slip frequency, of an amplitude independent of the slip and which becomes unidirectional at synchronism, impressing the auxiliary voltage on a secondary circuit to produce a synchronizing torque and during synchronous operation causing the auxiliary voltage to increase with increasing motor load.

9. The method of operating a motor which carries variable load at synchronous speed, comprising, producing a primary flux which revolves with respect to the primary, causing the primary flux to generate induction-motor-torque producing ampereturns in a secondary circuit, producing an auxiliary voltage of slip frequency of an amplitude independent of its frequency and which becomes unidirectional at synchronism, impressing the auxiliary voltage on a secondary circuit to produce a synchronizing torque which reaches a maximum when the slip frequency auxiliary voltage is at or near a maximum and during synchronous operation causing the auxiliary voltage to increase with increasing motor load.

In testimony whereof I affix my signature this 24th day of November, 1923.

VALÈRE ALFRED FYNN.